US012626954B2

(12) United States Patent
Park et al.

(10) Patent No.: US 12,626,954 B2
(45) Date of Patent: May 12, 2026

(54) GEL-TYPE ELECTROLYTE COMPOSITION FOR SECONDARY BATTERY AND SECONDARY BATTERY INCLUDING SAME

(71) Applicants: POSTECH Research and Business Development Foundation, Pohang-si (KR); GEV Co., Ltd., Eumseong-gun (KR)

(72) Inventors: Soojin Park, Pohang-si (KR); Hye Bin Son, Pohang-si (KR); Seoha Nam, Pohang-si (KR); Tae Sung Ha, Jincheon-gun (KR); Young Hwan Lee, Cheongju-si (KR); Ji Hyun Park, Sejong-si (KR)

(73) Assignees: POSTECH RESEARCH AND BUSINESS DEVELOPMENT FOUNDATION, Pohang-si (KR); GEV CO., LTD., Eumseong-Gun (KR)

( * ) Notice: Subject to any disclaimer, the term of this patent is extended or adjusted under 35 U.S.C. 154(b) by 568 days.

(21) Appl. No.: 18/111,640

(22) Filed: Feb. 20, 2023

(65) Prior Publication Data

US 2023/0318032 A1 Oct. 5, 2023

(30) Foreign Application Priority Data

Mar. 31, 2022 (KR) ........................ 10-2022-0040510
Jan. 18, 2023 (KR) ........................ 10-2023-0007435

(51) Int. Cl.
    *H01M 10/0565* (2010.01)
    *H01M 50/46* (2021.01)

(52) U.S. Cl.
    CPC ....... *H01M 10/0565* (2013.01); *H01M 50/46* (2021.01); *H01M 2300/0082* (2013.01); *H01M 2300/0085* (2013.01)

(58) Field of Classification Search
    None
    See application file for complete search history.

(56) References Cited

FOREIGN PATENT DOCUMENTS

| KR | 1020000064280 | 11/2000 | | |
|----|---------------|---------|---|---|
| KR | 20190064180 | 6/2019 | | |
| KR | 20190064180 A | * 6/2019 | ............ | H01M 4/139 |
| KR | 20190111872 | 10/2019 | | |
| KR | 20190111872 A | * 10/2019 | .......... | H01M 10/049 |
| KR | 1020200030975 | 3/2020 | | |

OTHER PUBLICATIONS

KIPO, Notice of Allowance of KR 10-2023-0007435 dated Jun. 10, 2025, total 10 pages.
KIPO, Office Action of the corresponding Korean Patent Application No. 10-2023-0007435, dated Mar. 14, 2025, total 10 pages.

* cited by examiner

*Primary Examiner* — Daniel S Gatewood
(74) *Attorney, Agent, or Firm* — LEX IP MEISTER, PLLC

(57) ABSTRACT

Provided is a gel-type electrolyte composition for a secondary battery and a secondary battery including the same, wherein the gel-type electrolyte composition includes a lithium salt, an organic solvent, a C1 to C5 alkoxy silane compound, and a multi-functional symmetrical compound having a (meth)acrylate group.

7 Claims, 6 Drawing Sheets

[FIG. 1A]
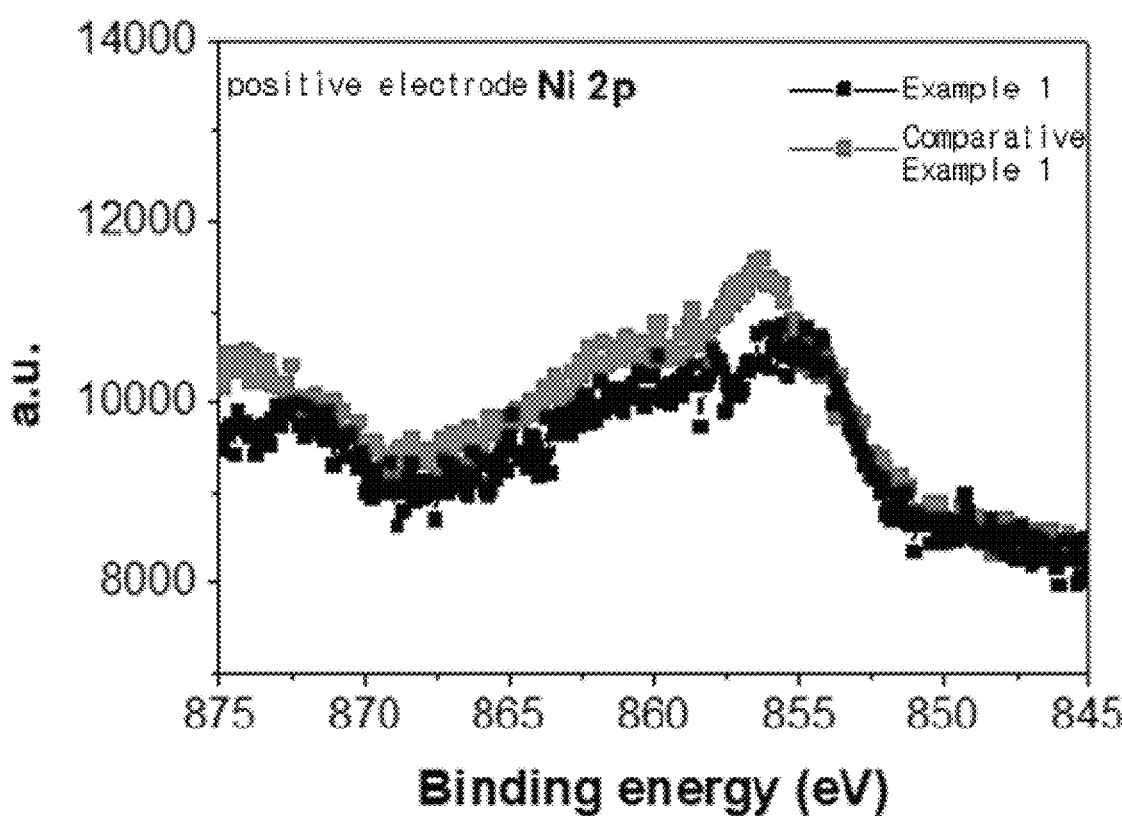

{FIG. 1B]
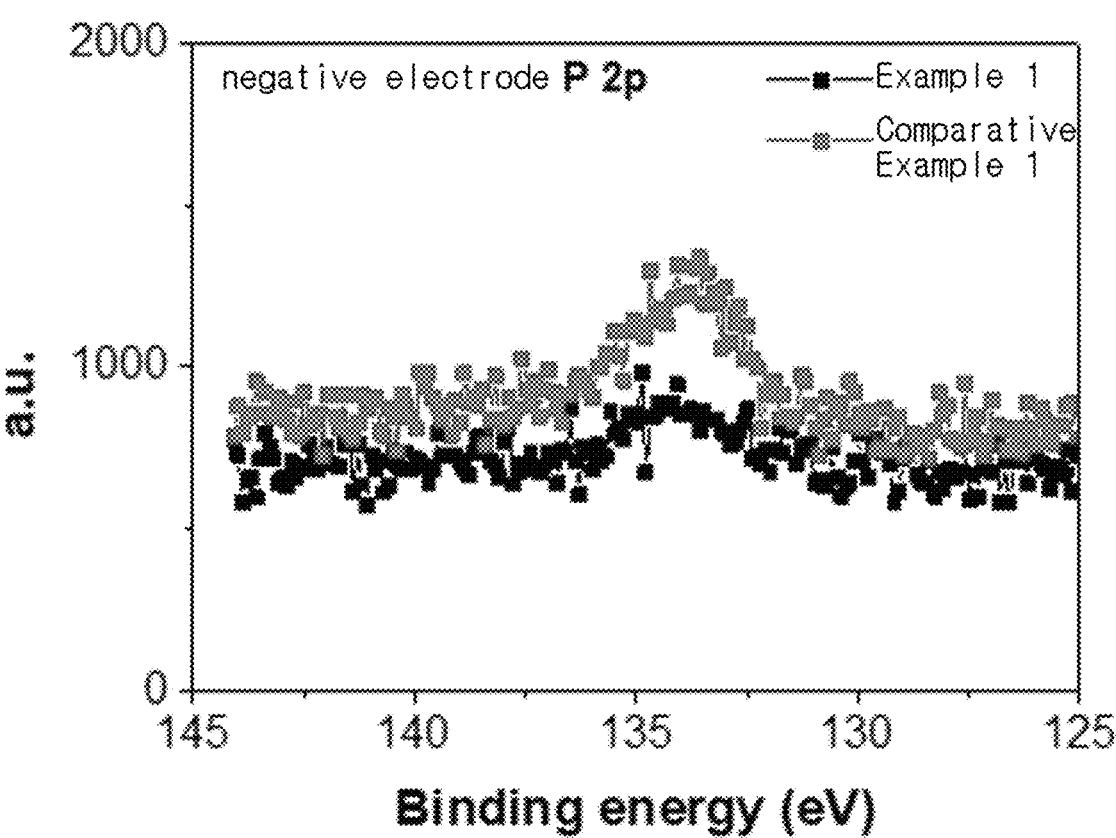

[FIG. 2]
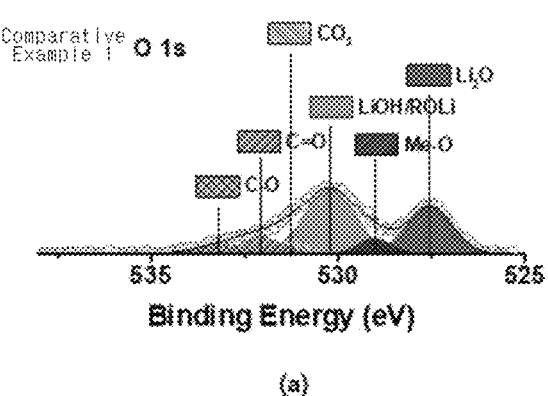
(a)
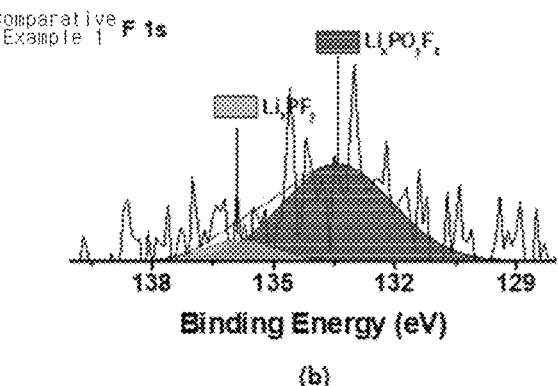
(b)
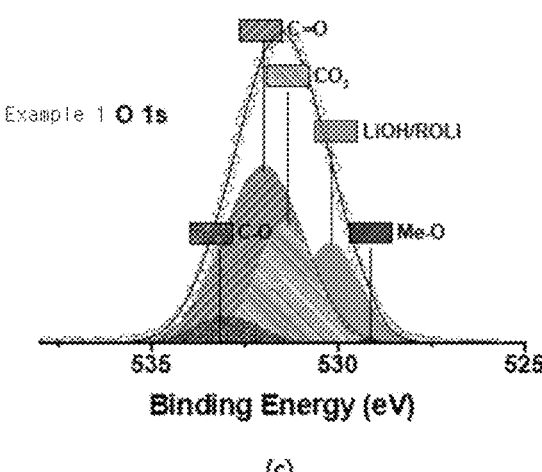
(c)
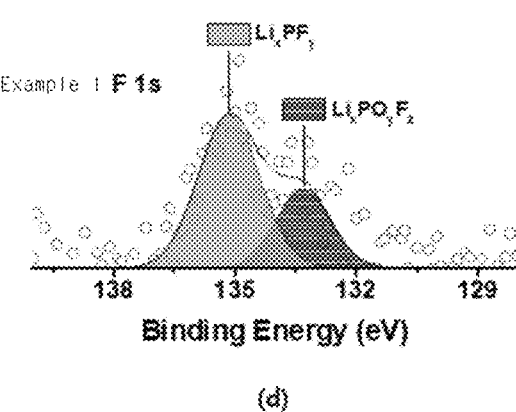
(d)

[FIG. 3A]
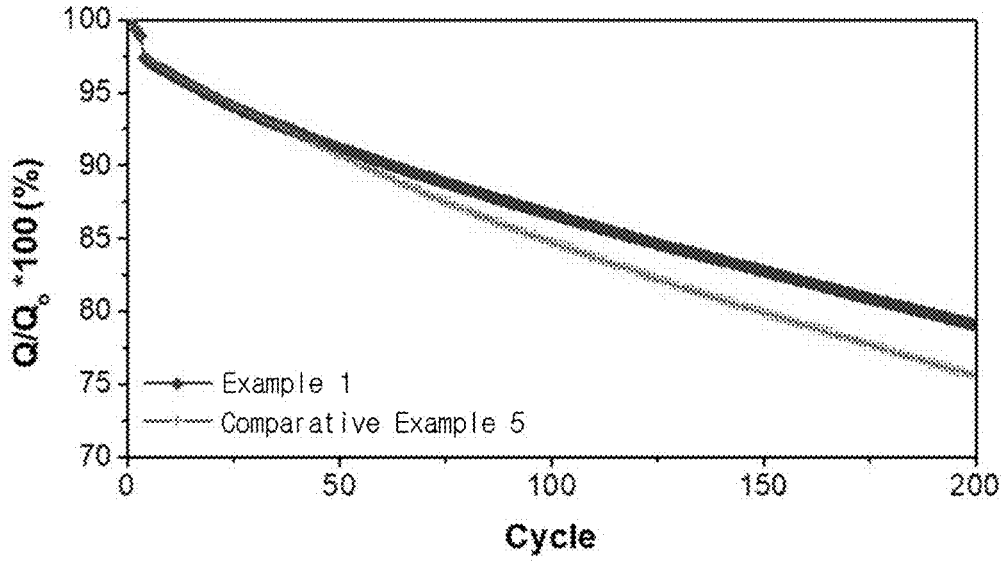
[FIG. 3B]
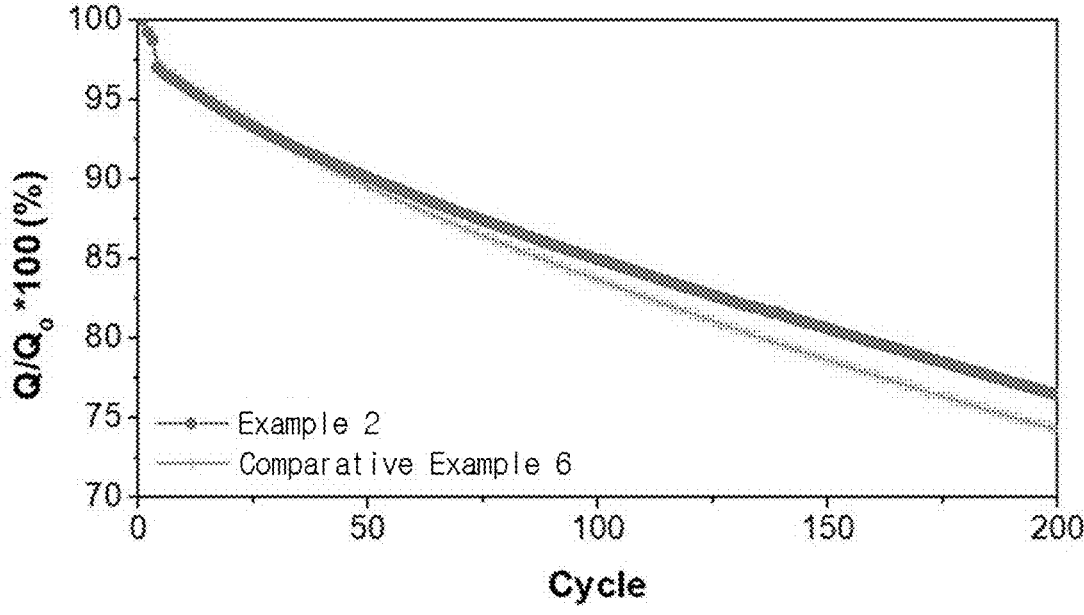

[FIG. 3C]
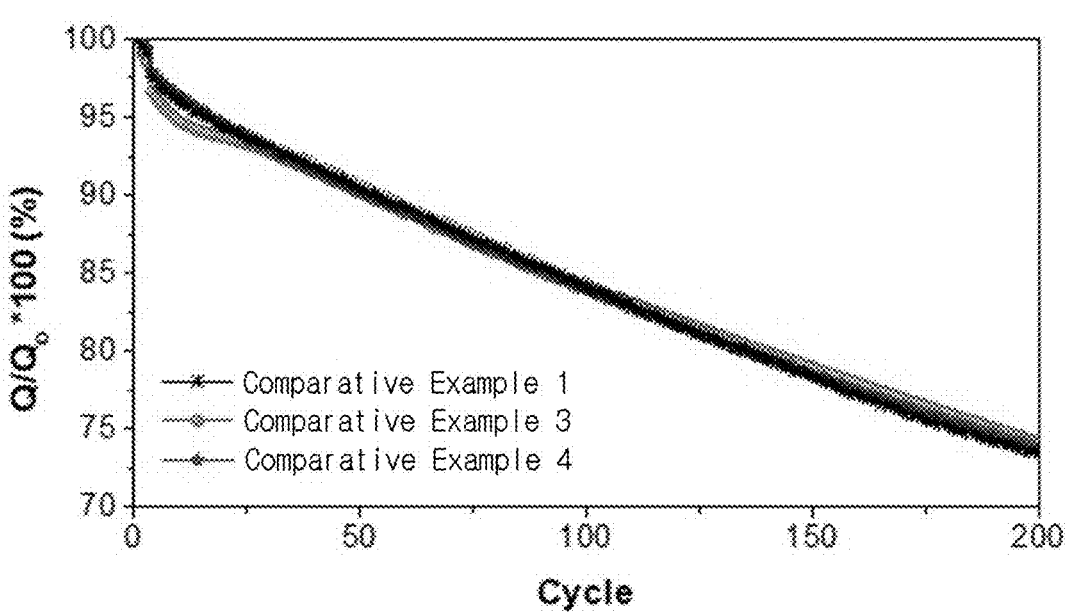
[FIG. 4]
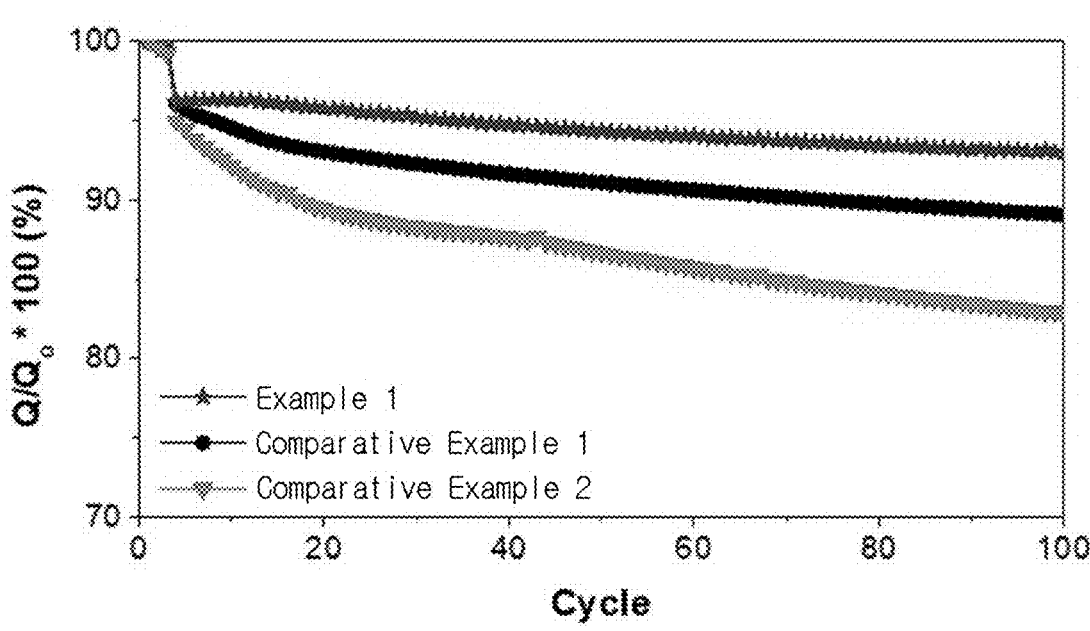

[FIG. 5]
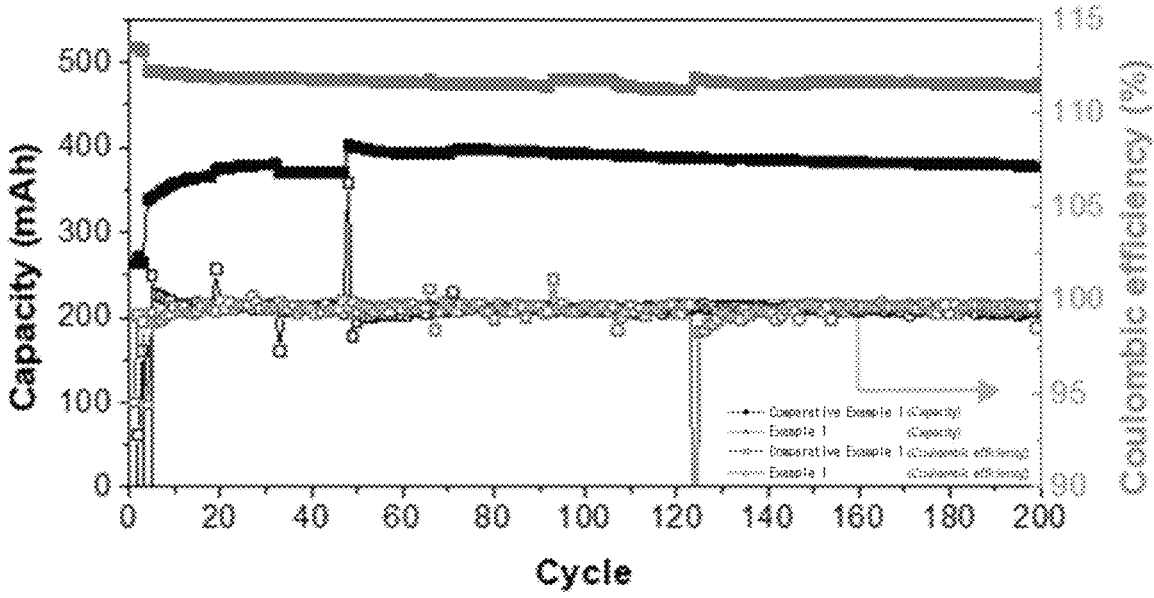

GEL-TYPE ELECTROLYTE COMPOSITION FOR SECONDARY BATTERY AND SECONDARY BATTERY INCLUDING SAME

BACKGROUND

1. Field

Embodiments relate to a gel-type electrolyte composition for a secondary battery and a secondary battery including the same.

2. Description of the Related Art

Lithium-ion secondary batteries are currently used in various devices to provide convenience to the extent that the Nobel Prize in Chemistry has been awarded in the field thereof. In addition, the electric vehicle market is greatly increasing due to the need for eco-friendly energy according to decarbonization policies.

However, recently, a stability issue has emerged due to an ignition limitation of electric vehicles to which secondary batteries are applied. Liquid electrolytes are a major cause of explosion and ignition, and various next-generation batteries are being developed to solve this limitation.

When a gel-type electrolyte is used as an alternative method of improving the safety of secondary batteries, there is an advantage in that leakage may be reduced and gas generation may be suppressed. However, due to the difficulty of commercialization, liquid electrolyte-based secondary batteries are still used.

Various types of energy may be used for gelation to produce a gel-type electrolyte. For example, curing may be performed through 1) UV, 2) thermal-curing, and 3) radiation energy. In the case of UV and thermal-curing, a separate initiator should be included due to low energy, so that there is a disadvantage in that cell performance may be degraded due to the initiator. On the contrary, when radiation energy is used, there is an advantage in that curing may be achieved without an initiator. In addition, the radiation energy has an advantage of being able to be applied to the current industry at a large area and fast process speed.

In addition, a lithium salt, which is an electrolyte used in a secondary battery, is vulnerable to moisture, so that moisture management is very important to suppress salt decomposition, and there are disadvantages in that the decomposed salt may destroy the surface of a positive electrode and additionally cause severe battery performance degradation at high temperatures. Various studies on electrolytes have been conducted to suppress such salt decomposition. However, in gel-type electrolytes, there are not sufficient studies conducted on these functional electrolytes.

In addition, due to the low ion conductivity of a gel-type electrolyte, the gel-type electrolyte has lower electrochemical performance than a typical liquid electrolyte. In this regard, it is necessary to develop a multi-functional gel-type electrolyte precursor and apply process technology in order to secure interface properties and secure battery performance.

SUMMARY

An aspect of the present invention provides a gel-type electrolyte composition for a secondary battery having excellent stability and electrochemical performance.

Another aspect of the present invention provides a secondary battery including the gel-type electrolyte composition.

According to at least one of embodiments, a gel-type electrolyte composition for a secondary battery includes a lithium salt, an organic solvent, a C1 to C5 alkoxy silane compound, and a multi-functional symmetrical compound having a (meth)acrylate group.

The alkoxy silane compound may include a (meth)acrylate group or an epoxy group.

The alkoxy silane compound may include 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, 2-(3,4 epoxycyclohexyl) ethyltrimethoxysilane, 3-glycidoxypropyl methyldimethoxysilane, 3-gylcidoxypropyl trimethoxysilane, 3-glycidoxypropyl methyldiethoxysilane, 3-glycidoxypropyl triethoxysilane, 3-(trimethoxysilyl)propyl acrylate, 3-(trimethoxysilyl)propyl methacrylate, or a combination thereof.

The multi-functional symmetric compound may include two to eight (meth)acrylate groups.

The multi-functional symmetric compound may include pentaerythritol tetraacrylate, di(trimethylolpropane) tetraacrylate, dipentaerythritol pentaacrylate, dipentaerythritol hexaacrylate, poly(ethylene glycol) diacrylate, poly(propylene glycol) diacrylate, bisphenol A glycerolate(1 glycerol/phenol) diacrylate, $(C_7H_{11}O_2)_n(SiO_{1.5})_n$ (wherein n is 1 to 100), $(C_6H_9O_2)_n(SiO_{1.5})_n$ (wherein n is 1 to 100), an acrylo POSS cage mixture, or a combination thereof.

The alkoxy silane compound and the multi-functional symmetrical compound may be included at a weight ratio of 0.1:99.9 to 10:90.

The organic solvent may be included in an amount of 75 wt % to 99 wt % based on the total amount of the gel-type electrolyte composition for a secondary battery, the alkoxy silane compound may be included in an amount of 0.1 wt % to 20 wt % based on the total amount of the gel-type electrolyte composition for a secondary battery, and the multi-functional symmetrical compound may be included in an amount of 0.5 wt % to 10 wt % based on the total amount of the gel-type electrolyte composition for a secondary battery.

The gel-type electrolyte composition may be gelled by the irradiation of an electron beam.

The electron beam may be irradiated in an irradiation dose of 3 kGy to 40 kGy.

According to another embodiment, a secondary battery includes a positive electrode, a negative electrode, a separator positioned between the positive electrode and the negative electrode, and the gel-type electrolyte composition.

The gel-type electrolyte composition may be gelled by irradiating the secondary battery with an electron beam.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings:

FIG. 1A and FIG. 1B are graphs showing X-ray photoelectron spectroscopy (XPS) of secondary batteries according to Example 1 and Comparative Example 1, and are graphs respectively for a positive electrode and a negative electrode;

FIG. 2 is a graph showing X-ray photoelectron spectroscopy (XPS) of a positive electrode interface of secondary batteries according to Example 1 and Comparative Example 1;

FIG. 3A is a graph showing the high-temperature capacity retention rate of the secondary batteries according to Example 1 and Comparative Example 5, FIG. 3B is a graph showing the high-temperature capacity retention rate of the secondary batteries according to Example 2 and Comparative Example 6, and FIG. 3C is a graph showing the high-temperature capacity retention rate of the secondary batteries according to Comparative Examples 1, 3 and 4;

FIG. 4 is a graph showing the room-temperature capacity retention rate of the secondary batteries according to Example 1 and Comparative Examples 1 and 2; and FIG. 5 is a graph showing the room-temperature capacity retention rate of the secondary batteries according to Example 1 and Comparative 1.

DETAILED DESCRIPTION

Hereinafter, embodiments will be described in detail to be easily carried out by those skilled in the art. However, the embodiments may be embodied in many different forms and the present invention is not limited to the embodiments described herein.

A gel-type electrolyte composition for a secondary battery according to an embodiment includes a lithium salt, an organic solvent, a C1 to C5 alkoxy silane compound, and a multi-functional symmetrical compound having a (meth) acrylate group.

The gel-type electrolyte composition for a secondary battery according to an embodiment includes the alkoxy silane compound and the multi-functional symmetric compound in addition to an organic electrolyte solution, and thus may improve ion conductivity and capture moisture and hydrofluoric acid to improve the stability and electrochemical performance of a secondary battery.

Specifically, when a secondary battery including the gel-type electrolyte composition is gelled through an electron beam, the secondary battery may be manufactured in situ within a short period of time. In addition, due to a multi-functional cross-linking agent such as the multi-functional symmetric compound, it is possible to secure ion conductivity which is about 50% or higher than that of a liquid electrolyte, and since the interfacial stability of an electrode is more stable than that of the liquid electrolyte, electrochemical performance may be improved. In addition, since a functional monomer such as the alkoxy silane compound and a multi-functional cross-linking agent such as the multi-functional symmetric compound are cross-linked by electron beam irradiation, and moisture and hydrofluoric acid are suppressed by the alkoxy silane compound, the electrochemical performance such as high-temperature lifespan properties of the secondary battery may be improved.

The alkoxy silane compound has an alkoxy silyl group corresponding to a functional group, and may have one to three, for example, two to three Si—O bonds at an end thereof. When an alkoxy silane compound having a Si—O bond in the above range is used, the ability to suppress salt decomposition and the ability to capture moisture and hydrofluoric acid may be increased to improve the stability and electrochemical performance of the secondary battery.

The alkoxy silane compound may include a (meth)acrylate group or an epoxy group which are activated by an electron beam. When the alkoxy silane compound having a (meth)acrylate group or an epoxy group is used, the alkoxy silane compound may be cross-linked by electron beam irradiation, thereby gelling an electrolyte, and accordingly, may improve the stability and electrochemical performance of the secondary battery.

The alkoxy silane compound may include 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, 2-(3,4 epoxycyclohexyl) ethyltrimethoxysilane, 3-glycidoxypropyl methyldimethoxysilane, 3-gylcidoxypropyl trimethoxysilane, 3-glycidoxypropyl methyldiethoxysilane, 3-glycidoxypropyl triethoxysilane, 3-(trimethoxysilyl)propyl acrylate, 3-(trimethoxysilyl)propyl methacrylate, or a combination thereof.

The alkoxy silane compound may be included in an amount of 0.1 wt % to 20 wt %, for example, 0.5 wt % to 10 wt %, based the total weight of the gel-type electrolyte composition for a secondary battery. When the alkoxy silane compound is included in the above content range, the electrochemical performance such as stability and high-temperature lifespan properties of the secondary battery may be improved.

The multi-functional symmetric compound is a compound having a symmetrical structure and at the same time, is a compound having a (meta)acrylate group activated by an electron beam. The multi-functional symmetric compound may include two to eight, for example, three to eight, four to eight, five to eight, or six to eight (meta)acrylate groups. When a multi-functional symmetric compound including a (meta)acrylate group in the above range is used, cross-linking ability by electron beam irradiation may be increased to increase ion conductivity, and the interfacial stability of an electrode is increased to improve the electrochemical performance of a secondary battery.

The multi-functional symmetric compound may include pentaerythritol tetraacrylate, di(trimethylolpropane) tetraacrylate, dipentaerythritol pentaacrylate, dipentaerythritol hexaacrylate, poly(ethylene glycol) diacrylate, poly(propylene glycol) diacrylate, bisphenol A glycerolate(1 glycerol/ phenol) diacrylate, $(C_7H_{11}O_2)_n(SiO_{1.5})_n$ (wherein n is 1 to 100), $(C_6H_9O_2)_n(SiO_{1.5})_n$ (wherein n is 1 to 100), an acrylo POSS cage mixture, or a combination thereof.

The multi-functional symmetric compound may be included in an amount of 0.5 wt % to 10 wt %, for example, 0.5 wt % to 5 wt %, based the total weight of the gel-type electrolyte composition for a secondary battery. When a multi-functional symmetric compound is included in the above content range, ion conductivity is improved and the interfacial stability of an electrode is increased, so that the electrochemical performance of a secondary battery may be improved.

The alkoxy silane compound and the multi-functional symmetric compound may be included at a weight ratio of 0.1:99.9 to 10:90, and may be included, for example, at a weight ratio of 0.5:99.5 to 5:95. When an alkoxy silane compound and a multi-functional symmetric compound are included in the above weight ratio range, cross-linking ability by electron beam irradiation is increased, so that ion conductivity may be increased, and moisture and hydrofluoric acid are suppressed, so that the electrochemical performance of a secondary battery may be improved.

The lithium salt is dissolved in an organic solvent and acts as a source of lithium ions in the secondary battery to enable the operation of the basic secondary battery and to promote the movement of lithium ions between the positive and negative electrodes.

Specific examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (wherein x and y are natural numbers), $LiCl$, $LiI$, $LiB(C_2O_4)_2$ (lithium bis(oxalato) borate (LiBOB)), or a combination thereof.

The concentration of the lithium salt may be used within a range of about 0.1 M to about 2.0 M. When the concentration of a lithium salt is included in the above range, a gel-type electrolyte composition has suitable conductivity and viscosity, and thus may exhibit excellent electrolyte performance, and lithium ions may effectively move.

The organic solvent serves as a medium through which ions involved in an electrochemical reaction of the secondary battery may move. The organic solvent is a non-aqueous organic solvent, and may be selected from carbonate-based, ester-based, ether-based, ketone-based, alcohol-based, and aprotic solvents.

As the carbonate-based solvent, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like may be used.

Particularly, when a chain-type carbonate compound and a cyclic carbonate compound are mixed and used, it is preferable in that a dielectric constant may be increased, and at the same time, a solvent having low viscosity may be prepared. In this case, the cyclic carbonate compound and the chain-type carbonate compound may be mixed at a volume ratio of about 1:1 to about 1:9, and used.

In addition, as the ester-based solvent, for example, methyl acetate, ethyl acetate, n-propyl acetate, dimethyl acetate, methyl propionate, ethyl propionate, γ-butyrolactone, decanolide, valerolactone, mevalonolactone, caprolactone, or the like may be used. As the ether-based solvent, for example, dibutyl ether, tetraglime, diglaim, dimethoxyethane, 2-methyltetrahydrofuran, tetrahydrofuran, or the like may be used, and as the ketone-based solvent, cyclohexanone or the like may be used. In addition, as the alcohol-based solvent, ethyl alcohol, isopropyl alcohol, or the like may be used.

The organic solvent may be used alone or one or more thereof may be mixed and used, and when one or more thereof are mixed and used, the mixing ratio may be suitably adjusted according to desired battery performance.

The organic solvent may be included in an amount of 75 wt % to 99 wt % based on the total amount of the gel-type electrolyte composition for a secondary battery, and may be included, for example, in an amount of 85 wt % to 99 wt %. When an organic solvent is used within the above content range, excellent ion conductivity and excellent electrolyte performance may be exhibited.

The gel-type electrolyte composition according to an embodiment may be gelled by the irradiation of an electron beam.

The electron beam may be irradiated in an irradiation dose of 3 kGy to 40 kGy, and may be irradiated, for example, in an irradiation dose of 3 kGy to 20 kGy. When an electron beam is irradiated in an irradiation dose in the above range, the cross-linking ability of an alkoxy silane compound and a multi-functional symmetric compound is increased, thereby reducing interface resistance, so that the stability and electrochemical performance of a secondary battery may be improved.

Another aspect of the present invention provides a secondary battery including the gel-type electrolyte composition described above.

The secondary battery may include a positive electrode, a negative electrode, a separator positioned between the positive electrode and the negative electrode, and a gel-type electrolyte.

By irradiating the secondary battery assembled as described above with an electron beam, the gel-type electrolyte may be gelled, which is the same as described above, so that a description thereof will be omitted.

The positive electrode includes a current collector and a positive electrode active material layer positioned above the current collector.

As the current collector, aluminum may be used, but the embodiment of the present invention is not limited thereto.

The positive electrode active material layer includes a positive electrode active material. As the positive electrode active material, a compound capable of reversible intercalation and de-intercalation of lithium (a lithiated intercalation compound) may be used, and specifically, a lithium metal oxide may be used. As the lithium metal oxide, specifically, an oxide including at least one metal selected from cobalt, manganese, nickel, and aluminum, and lithium may be used.

The positive electrode active material layer may further include a binder and a conductive material.

The binder serves to adhere positive electrode active material particles to each other well, and also to adhere the positive electrode active material to the positive electrode current collector, and representative examples thereof may include polyvinyl alcohol, carboxymethyl cellulose, hydroxypropyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like, but are not limited thereto.

The conductive material is used to impart conductivity to an electrode, and any conductive material may be used as long as it is an electron conductive material which does not cause a chemical change in a battery to be constituted, and an example thereof may be a carbon-based material such as natural graphite, artificial graphite, carbon black, acetylene black, Ketjen black, and carbon fiber, a metal-based material such as metal powder or metal fiber of such as copper, nickel, aluminum, or silver, a conductive polymer such as a polyphenylene derivative, or a conductive material including a mixture thereof.

The negative electrode includes a current collector and a negative electrode active material layer positioned above the current collector.

As the current collector, copper foil, nickel foil, stainless steel foil, titanium foil, nickel foam, copper foam, a conductive metal-coated polymer substrate, or a combination thereof may be used, but the embodiment of the present invention is not limited thereto.

The negative electrode active material layer includes a negative electrode active material.

As the negative electrode active material, a material capable of reversible intercalation/de-intercalation of lithium ions, a lithium metal, an alloy of lithium metal, a material capable of doping and undoping lithium, or a transition metal oxide may be used, and specifically, a material capable of reversible intercalation/de-intercalation of lithium ions may be used. The material capable of reversible intercalation/de-intercalation of lithium ions is a carbon material, and any carbon-based negative electrode active material commonly used in a lithium secondary battery may be used, and representative examples thereof may include a crystalline carbon, an amorphous carbon, or a combination thereof. Examples of the crystalline carbon may include graphite such as an irregular, planar, flaky, spherical, or fibrous natural graphite or artificial graphite, and examples of the amorphous carbon may include soft carbon (low-temperature fired carbon) or hard carbon, mezophase pitch carbides, fired cokes, and the like.

The negative electrode active material layer may further include a binder and a conductive material.

The binder serves to adhere negative electrode active material particles to each other well, and also to adhere the negative electrode active material to the negative electrode current collector, and representative examples thereof may include polyvinyl alcohol, carboxymethyl cellulose, hydroxypropyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like, but are not limited thereto.

The conductive material is used to impart conductivity to an electrode, and any conductive material may be used as long as it is an electron conductive material which does not cause a chemical change in a battery to be constituted, and an example thereof may be a carbon-based material such as natural graphite, artificial graphite, carbon black, acetylene black, Ketjen black, and carbon fiber, a metal-based material such as metal powder or metal fiber of such as copper, nickel, aluminum, or silver, a conductive polymer such as a polyphenylene derivative, or a conductive material including a mixture thereof.

The positive electrode and the negative electrode are each manufactured by preparing an active material composition by mixing an active material, a conductive material, and a binder in a solvent, and then applying the composition on a current collector. Since the above method for manufacturing an electrode is widely known in the art, and thus a detailed description thereof will be omitted herein. As the solvent, N-methylpyrrolidone or the like may be used, but the embodiment of the present invention is not limited thereto.

The separator is to separate the negative electrode and the positive electrode and to provide a movement path for lithium ions, and any separator may be used as long as it is a separator typically used in a lithium battery. That is, a separator having excellent moisture-retention of an electrolyte solution as well as low resistance to ion movement in an electrolyte may be used. For example, a separator selected from glass fiber, polyester, polyethylene, polypropylene, polytetrafluoroethylene (PTFB), or a combination thereof and in the form of a nonwoven fabric or a woven fabric may be used. For example, in a lithium ion battery, a polyolefin-based polymer such as polyethylene and polypropylene is mainly used, or a coated separator containing a ceramic component or polymer material may be used in order to secure heat resistance or mechanical strength, and such a separator may be used in a single-layered or multi-layered structure, selectively.

Hereinafter, specific embodiments of the present invention will be presented. However, the embodiments described below are only for specifically illustrating or describing the present invention, and the present invention should not be limited thereby. In addition, contents not described herein can be sufficiently technically inferred by those skilled in the art, and thus, the description thereof will be omitted.
(Preparation of Gel-Type Electrolyte Composition for Secondary Battery)

Example 1

A gel-type electrolyte composition was prepared by adding 0.2 g of dipentaerythritol hexaacrylate and 0.1 g of 3-(trimethoxysilyl)propyl methacrylate to 9.7 g of an organic solvent (EC:EMC:DMC, 1:1:1 volume ratio) in which 1 M of $LiPF_6$ was dissolved.

Example 2

A gel-type electrolyte composition was prepared by adding 0.3 g of pentaerythritol tetraacrylate and 0.4 g of 3-(trimethoxysilyl)propyl methacrylate to 9.3 g of an organic solvent (EC:EMC:DMC, 1:1:1 volume ratio) in which 1 M of $LiPF_6$ was dissolved.

Comparative Example 1

A liquid electrolyte was prepared by mixing 1 M of a $LiPF_6$ lithium salt in an organic solvent (EC:EMC:DMC, 1:1:1 volume ratio).

Comparative Example 2

A gel-type electrolyte composition was prepared by adding 0.1 g of 3-(trimethoxysilyl)propyl methacrylate to 10 g of an organic solvent (EC:EMC:DMC, 1:1:1 volume ratio) in which 1 M of $LiPF_6$ was dissolved.

Comparative Example 3

A gel-type electrolyte composition was prepared by adding 0.5 g of trimethylolpropane ethoxylate triacrylate to 9.5 g of an organic solvent (EC:EMC:DMC, 1:1:1 volume ratio) in which 1 M of $LiPF_6$ was dissolved.

Comparative Example 4

A gel-type electrolyte composition was prepared by adding 0.2 g of dipentaerythritol pentaacrylate to 9.5 g of an organic solvent (EC:EMC:DMC, 1:1:1 volume ratio) in which 1 M of $LiPF_6$ was dissolved.

Comparative Example 5

A gel-type electrolyte composition was prepared by adding 0.2 g of dipentaerythritol hexaacrylate to 9.8 g of an organic solvent (EC:EMC:DMC, 1:1:1 volume ratio) in which 1 M of $LiPF_6$ was dissolved.

Comparative Example 6

A gel-type electrolyte composition was prepared by adding 0.2 g of pentaerythritol tetraacrylate to 9.8 g of an organic solvent (EC:EMC:DMC, 1:1:1 volume ratio) in which 1 M of $LiPF_6$ was dissolved.
(Manufacturing of Secondary Battery)

$LiNi_{0.6}Co_{0.2}Mn_{0.2}O_2$(NCM) as a positive electrode active material, carbon black as a conductive material, and polyvinylidene fluoride (PVDF) as a binder were added to N-methyl-2-pyrrolidone (NMP) as a solvent at a weight ratio of 90:5:5 to prepare a positive electrode mixture slurry (solid content: 50 wt %). The positive electrode mixture slurry was applied on an aluminum (Al) thin film, which is a positive electrode current collector, having a thickness of about 20 μm, dried and then roll-pressed to manufacture a positive electrode.

Artificial graphite as a negative electrode active material, carbon black as a conductive material, and styrene-butadiene rubber and carboxymethylcellulose (SBR/CMC) as a binder were added to water as a solvent at a weight ratio of 95.5:1:1.5:2, and the mixture was coated on a copper (Cu) thin film having a thickness of 18 μm, dried and then roll-pressed to manufacture a negative electrode.

The positive electrode, the negative electrode, and a polyethylene separator were sequentially stacked, and then the gel-type electrolyte composition prepared in each of Examples 1 and 2 and Comparative Examples 1 to 6 was introduced thereto to prepare each electrode assembly.

Subsequently, a coin-type battery made of sus was assembled, and then the battery placed in a container made of polypropylene was allowed to pass through an electron beam facility of 10 MeV once to be irradiated with an irradiation dose of 15 kGy.

Evaluation 1: Gelation Rate of Gel-Type Electrolyte Composition

The gelation rate of the gel-type electrolyte composition prepared in each of Examples 1 and 2 and Comparative Examples 1 to 3 was measured by the following method, and the results are shown in Table 1 below.

A weight ($M_b$) of a 5 mL polypropylene (PP) bottle was measured and 1 g of the gel-type electrolyte composition was introduced thereto. Thereafter, a container containing the gel-type electrolyte composition was irradiated with an electron beam at 15 kGy, and the weight thereof was measured ($M_{b+i}$). Thereafter, 0.5 g of dimethyl carbonate (DMC) solvent was introduced to the polypropylene bottle and unreacted substances were sufficiently impregnated at a temperature of 45° C. for 24 hours. Thereafter, the introduced DMC was poured and dried at a temperature of 45° C. for 48 hours. Thereafter, the weight of the bottle containing the dried polymer was measured ($M_f$), and calculated by Equation 1 below.

$$\text{Gelation rate (\%)} = \{(M_f - M_b)/(M_{b+i} - M_b)\} \times 100 \quad \text{[Equation 1]}$$

TABLE 1

| | Gelation rate (%) |
|---|---|
| Example 1 | 23.3 |
| Example 2 | 25.08 |
| Comparative Example 1 | 0 |
| Comparative Example 2 | 0 |
| Comparative Example 3 | 20.82 |

As shown in Table 1 above, it can be seen that the gel-type electrolyte composition for a secondary battery according to each of Examples 1 and 2 has a high gelation rate compared to the cases of Comparative Examples 1 to 3. Accordingly, it can be seen that the electrochemical performance of the secondary battery according to an embodiment is excellent.

Evaluation 2: Ion Conductivity of Gel-Type Electrolyte Composition

The ion conductivity of the gel-type electrolyte composition according to each of Example 1 and Comparative Examples 3 to 6 was measured by the following method, and the results are shown in Table 2 below.

In order to measure the ion conductivity of the composition, the AC impedance was measured in the frequency range of 1 KHz to 100 mHz after assembling a stainless steel/separator/stainless steel 2032 type coin cell.

TABLE 2

| | Ion conductivity (mS/cm) |
|---|---|
| Example 1 | 0.89 |
| Comparative Example 3 | 0.71 |
| Comparative Example 4 | 0.80 |
| Comparative Example 5 | 0.88 |
| Comparative Example 6 | 0.81 |

As shown in Table 2 above, it can be seen that the gel-type electrolyte composition for a secondary battery according to Example 1 has high ion conductivity compared to the cases of Comparative Examples 3 to 6. Accordingly, it can be seen that the electrochemical performance of the secondary battery according to an embodiment is excellent.

Evaluation 3: X-Ray Photoelectron Spectroscopy (XPS) of Secondary Battery

X-ray photoelectron spectroscopy (XPS) was measured by the following method for the secondary batteries according to Example 1 and Comparative Example 1, and the results are shown in FIG. 1A and FIG. 1B.

A sample collected by introducing the gel-type electrolyte composition of Example 1 into a full cell in which NCM was used as the positive electrode and artificial graphite was used as the negative electrode, irradiating the full cell with an electron beam, and performing chemical charging and discharging on the full cell, followed by dismantling the full cell, and a sample collected by irradiating a full cell, to which the liquid electrolyte of Comparative Example 1 was introduced, with an electron beam, and performing chemical charging and discharging on the full cell, followed by dismantling the full cell were each attached to a substrate. The substrate was irradiated with X-rays having an Al Kα source in order to measure the kinetic energy and strength of electrons coming out of the sample, so as to confirm inherent binding energy of the electrons in a material.

FIG. 1A and FIG. 1B are graphs showing X-ray photoelectron spectroscopy (XPS) of secondary batteries according to Example 1 and Comparative Example 1, and are graphs respectively for a positive electrode and a negative electrode.

Referring to FIG. 1A and FIG. 1B, due to the multifunctional symmetric compound capable of electron beam activation, the secondary battery according to Example 1 showed a slight decrease in nickel elution at a positive electrode interface and also a reduced degree of lithium salt decomposition after the chemical charging and discharging compared to Comparative Example 1 in which the liquid electrolyte was used.

In addition, FIG. 2 is a graph showing X-ray photoelectron spectroscopy (XPS) of a positive electrode interface of the secondary batteries according to Example 1 and Comparative Example 1.

From the result of analyzing the positive electrode interface after the chemical charging and discharging, it can be seen that, referring to (a) in FIG. 2, in the case of Comparative Example 1, there are LiOH and $Li_2O$ present in a large amount of 44% and 28%, respectively, which act as a resistance layer of the positive electrode, whereas referring to (c), in the case of Example 1, a stable interface layer is formed due to the gel-type electrolyte. In addition, referring to (b) and (d) in FIG. 2, in the case of Comparative Example 1, $Li_xPO_yF_z$, a by-product of the salt decomposition, is generated in a large amount compared to Example 1, and thus, it can be seen from the result that in the case of Example 1, salt decomposition is suppressed due to the formation of a stable interface layer.

Evaluation 4: High-Temperature Lifespan Properties of Secondary Battery

The secondary battery according to each of Examples 1 and 2 and Comparative Examples 1 and 3 to 6 were charged and discharged under the following conditions, and the electrochemical performance thereof was measured accordingly, and the results are shown in Table 3 below and in FIGS. 3A to 3C.

For chemical charging and discharging, CC/CV charging was performed at 0.1 C at 25° C. and CC discharging was performed, and then charging and discharging were performed at 0.5 C for 3 cycles at 55° C. and 200 cycles were performed at 1 C.

TABLE 3

| | High-temperature capacity retention rate (%) |
|---|---|
| Example 1 | 79.07 |
| Example 2 | 76.41 |
| Comparative Example 1 | 73.40 |
| Comparative Example 3 | 74.16 |
| Comparative Example 4 | 73.85 |
| Comparative Example 5 | 75.59 |
| Comparative Example 6 | 74.22 |

FIG. 3A is a graph showing the high-temperature capacity retention rate of the secondary batteries according to Example 1 and Comparative Example 5, FIG. 3B is a graph showing the high-temperature capacity retention rate of the secondary batteries according to Example 2 and Comparative Example 6, and FIG. 3C is a graph showing the high-temperature capacity retention rate of the secondary batteries according to Comparative Examples 1, 3 and 4.

Referring to Table 3 above and FIG. 3A to FIG. 3C, it can be seen that the secondary batteries according to Examples 1 and 2 have excellent high-temperature lifespan properties compared to the cases of Comparative Examples 1 and 3 to 6. Accordingly, it can be seen that the secondary battery according to an embodiment has excellent electrochemical performance at high temperatures.

Evaluation 5: Room-Temperature Lifespan Properties of Secondary Battery

The secondary battery according to each of Example 1 and Comparative Examples 1 and 2 was charged and discharged under the following conditions, and the electrochemical performance thereof was measured accordingly, and the results are shown in Table 4 below and FIG. 4.

For chemical charging and discharging, CC/CV charging was performed at 0.1 C at 25° C. and CC discharging was performed, and then charging and discharging were performed at 0.5 C for 3 cycles at 25° C. and 200 cycles were performed at 1 C.

TABLE 4

| | Room-temperature capacity retention rate (%) |
|---|---|
| Example 1 | 92.98 |
| Comparative Example 1 | 89.05 |
| Comparative Example 2 | 82.83 |

FIG. 4 is a graph showing the room-temperature capacity retention rate of the secondary batteries according to Example 1 and Comparative Examples 1 and 2.

Referring to Table 4 above and FIG. 3, it can be seen that the secondary battery according to Example 1 has excellent room-temperature lifespan properties compared to Comparative Example 1 in which only the liquid electrolyte was used. In addition, referring to Comparative Example 2, it has been confirmed that when the liquid electrolyte contains an impurity-capturing functional group, cross-linking is not achieved, thereby preventing the impurity-capturing functional group from serving its purpose, and thus, it can be seen that lifespan properties are degraded compared to Example 1.

In addition, the positive electrode, the negative electrode, which are manufactured above, and a polyethylene separator were sequentially stacked, and then the gel-type electrolyte composition prepared in each of Example 1 and Comparative Example 1 was introduced thereto to prepare each electrode assembly. Subsequently, a pouch-type battery made of propylene was assembled, and then the battery was allowed to pass through an electron beam facility of 10 MeV once to be irradiated with an irradiation dose of 7 kGy. Each of the manufactured secondary batteries was charged and discharged under the following conditions, and the electrochemical performance thereof was measured accordingly, and the results are shown in Table 5 below.

For chemical charging and discharging, CC/CV charging was performed at 0.1 C at 25° C. and CC discharging was performed, and then charging and discharging were performed at 0.5 C for 3 cycles at 25° C. and 200 cycles were performed at 1 C.

FIG. 5 is a graph showing the room-temperature capacity retention rate of the secondary batteries according to Example 1 and Comparative 1.

Referring to FIG. 5, it can be seen that the secondary battery according to Example 1 has excellent room-temperature lifespan properties compared to Comparative Example 1 in which only the liquid electrolyte was used.

Evaluation 6: Cell Thickness Change of Secondary Battery

Charging and discharging was performed on the secondary batteries according to Example 1 and Comparative Example 1 under the following conditions, and the change in pouch cell thickness was measured accordingly, and the results are shown in Table 5 below. For chemical charging and discharging, CC/CV charging was performed at 0.05 C at 25° C. and CC discharging was performed, and then charging and discharging were performed at 0.3 C for 3 cycles at 25° C. and 200 cycles were performed at 0.5 C.

TABLE 5

|  | Cell thickness after chemical charge and discharge (mm) | Cell thickness after 200 cycles (mm) |
| --- | --- | --- |
| Example 1 | 3.38 | 3.30 |
| Comparative Example 1 | 7.17 | 3.63 |

Referring to Table 5 above, it can be seen that compared to Comparative Example 1 in which only the liquid electrolyte was used, the secondary battery according to Example 1 had reduced gas generation due to the suppression of salt decomposition by the cross-linking agent, thereby having a smaller cell thickness, and the cell thickness hardly changed even with the progress of the cycle.

Although preferred embodiments of the present invention have been described above, the present invention is not limited thereto, and it is possible to perform various modifications within the scope of the claims, the detailed description of the invention, and the accompanying drawings. It is obvious that the modifications also fall within the scope of the present invention.

What is claimed is:

1. A gel-type electrolyte composition for a secondary battery, the gel-type electrolyte composition comprising:
   a lithium salt;
   an organic solvent;
   a C1 to C5 alkoxy silane compound; and
   a multi-functional symmetrical compound having a (meth)acrylate group,
   wherein the multi-functional symmetrical compound comprises four to eight (meth)acrylate groups,
   the alkoxy silane compound and the multi-functional symmetrical compound are included at a weight ratio of 0.1:99.9 to 10:90, and
   the gel-type electrolyte composition is gelled by an irradiation of an electron beam.

2. The gel-type electrolyte composition of claim 1, wherein the alkoxy silane compound comprises a (meth) acrylate group or an epoxy group.

3. The gel-type electrolyte composition of claim 1, wherein the alkoxy silane compound comprises 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, 2-(3,4 epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane, 3-(trimethoxysilyl)propyl acrylate, 3-(trimethoxysilyl)propyl methacrylate, or a combination thereof.

4. The gel-type electrolyte composition of claim 1, wherein the multi-functional symmetrical compound comprises pentaerythritol tetraacrylate, di(trimethylolpropane) tetraacrylate, dipentaerythritol pentaacrylate, dipentaerythritol hexaacrylate, an acrylo POSS cage mixture, or a combination thereof.

5. The gel-type electrolyte composition of claim 1, wherein:
   the organic solvent is included in an amount of 75 wt % to 99 wt % based on the total amount of the gel-type electrolyte composition for a secondary battery;
   the alkoxy silane compound is included in an amount of 0.1 wt % to 20 wt % based on the total amount of the gel-type electrolyte composition for a secondary battery; and
   the multi-functional symmetrical compound is included in an amount of 0.5 wt % to 10 wt % based on the total amount of the gel-type electrolyte composition for a secondary battery.

6. The gel-type electrolyte composition of claim 1, wherein the electron beam is irradiated in an irradiation dose of 3 kGy to 40 kGy.

7. A secondary battery comprising:
   a positive electrode;
   a negative electrode;
   a separator positioned between the positive electrode and the negative electrode; and
   the gel-type electrolyte composition of claim 1.

* * * * *